Aug. 21, 1956 J. S. BRYAN 2,759,996

COLOR TELEVISION REGISTRATION CONTROL SYSTEM

Filed June 30, 1951

INVENTOR.
JAMES S. BRYAN
BY
Allen V. Hazeltine
ATTORNEY

United States Patent Office 2,759,996
Patented Aug. 21, 1956

2,759,996

COLOR TELEVISION REGISTRATION CONTROL SYSTEM

James S. Bryan, Philadelphia, Pa., assignor to Philco Corporation, Philadelphia, Pa., a corporation of Pennsylvania Application June 30, 1951, Serial No. 234,554

9 Claims. (Cl. 178—5.4)

Figures 1, 2:
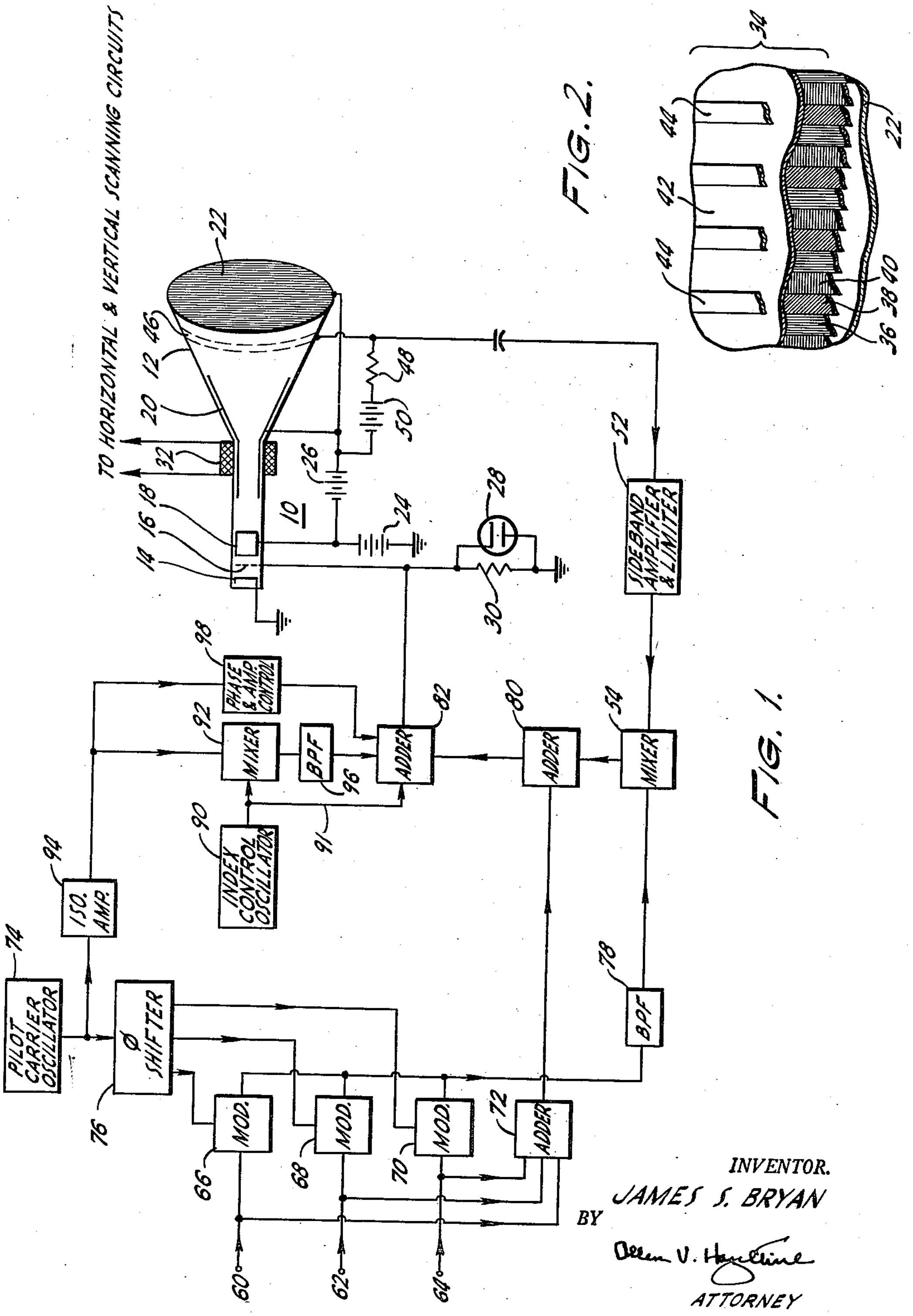

The present invention relates to electrical systems and more particularly to cathode-ray tube systems comprising a beam intercepting member and an indexing member which is arranged in cooperative relationship with the beam intercepting member and is adapted to produce a signal whose time of occurrence is indicative of the position of the cathode-ray beam relative to the beam intercepting member.

The invention is particularly adapted for use and will be described in connection with a color television image presentation system utilizing a single cathode-ray tube having a beam intercepting, image forming screen member comprising vertical stripes of luminescent materials. These stripes are preferably arranged in laterally-displaced color triplets, each triplet comprising three vertical phosphor stripes which respond to electron impingement to produce light of the different primary colors. The order of arrangement of the stripes may be such that the normally horizontally-scanning cathode-ray beam produces red, green and blue light successively. From a color television receiver there may then be supplied three separate video signals, each indicative of a different primary color component of a televised scene, which signals are sampled sequentially and utilized to control the intensity of the cathode-ray beam. For proper color rendition, it is then required that, as the phosphor stripes producing each of the primary colors of light are impinged by the cathode-ray beam, the intensity of the beam be simultaneously controlled in response to the contemporaneous value of the video signal representing the corresponding color component of the televised image. However, since the rate at which the beam scans across the phosphor stripes of the screen may vary, due, for example, to non-linearity of the beam deflecting signal, or due to a non-uniform distribution of the color triplets on the screen surface, the times at which the samples of the several video color signals should be taken will generally not occur exactly periodically. To obtain proper timing of the sampling operations, it is therefore desirable to derive signals indicative of the instantaneous position of the cathode-ray beam upon the image-forming screen, and to utilize these indexing signals to control the times at which samplings of the several color signals are effected. The said indexing signals may be derived from a plurality of stripe members arranged on the beam intercepting screen structure, each adjacent a triplet, so that, when the beam scans the screen, the indexing stripes are excited in spaced time sequence relative to the scanning of the color triplets and a series of pulses is generated in a suitable output electrode system of the cathode-ray tube.

The indexing stripes may comprise a material having secondary-emissive properties which differ from the secondary-emissive properties of the remaining portions of the beam intercepting structure. For example, the indexing stripes may consist of a high atomic number material such as gold, platinum or tungsten or may consist of certain oxides such as magnesium oxide, and the remainder of the beam intercepting structure may be provided with a coating of a material having a detectably different secondary-emissive ratio, such as aluminum, which coating also serves as a light reflecting mirror for the phosphor stripes in accordance with well known practice. With such an arrangement the indexing signals may be derived from a collector electrode arranged in the vicinity of the screen structure. Alternatively, the indexing stripes may consist of a fluorescent material, such as zinc oxide, having a spectral output in the non-visible light region and the indexing signals may be derived from a suitable photo-electric cell arranged, for example, in a side wall portion of the cathode-ray tube out of the path of the cathode-ray beam and facing the beam intercepting surface of the screen structure.

In practice there exists the danger that the normally detectable voltage indicating the impingement of the beam onto the indexing stripes may be masked or at least contaminated by spurious voltages. More particularly, it is found that, at the high accelerating voltages of the order of 10 to 20 kilovolts used in the cathode-ray tubes for the systems under consideration, only a relatively small difference in the secondary-emissive ratio of the materials of the indexing stripes and of the remainder of the screen structure can be realized and that, in the heretofore proposed systems, the presence of video signals and noise voltages in the collector electrode system may significantly diminish the effective value of the indexing signal. Similarly, in those instances in which the indexing signal is produced by means of a photoelectric detector and indexing stripes comprising a fluorescent material which produces light in the non-visible region of the spectrum, the detector may also be actuated by soft X-rays which are produced by the high voltage beam or by extraneous light from sources external to the cathode-ray tube or from the phosphor stripes of the color triplets, the latter light in some instances penetrating the aluminum mirror coating superimposed on the color stripes.

In the copending application of E. M. Creamer, Jr., et al., Serial No. 240,324 filed August 4, 1951, now Patent No. 2,667,534 granted January 26, 1954, there have been described systems by means of which the desired indexing information may be obtained in a readily usable form with a minimum of components at the video signal frequencies appearing in the indexing signal circuits. More particularly, and in accordance with the principles set forth in the said copending application, use is made of the finding that the scanning of the indexing stripes by the electron beam will produce, in the collector circuit of the cathode-ray tube, signal components which represent modulation products as determined by the intensity variations of the beam and the rate of scanning of the index stripes. Accordingly, by additionally varying the intensity of the beam at a pilot carrier frequency rate widely different from the rate at which the beam intensity is varied by the video signal, an output signal is produced in the collector electrode of the cathode-ray tube comprising, as one component, modulation products proportional to the pilot carrier frequency and the rate of scanning the index stripes. Because of their widely different frequency range, these modulation products may readily be separated from those generated modulation products which are proportional to the video signal frequencies and the rate of scanning of the index stripes. The pilot carrier modulation products consist essentially of a carrier wave at the pilot carrier frequency and sidebands representing the sum and difference of the pilot carrier frequency and the rate of scanning the index stripes. Any change in the rate of scanning of the index stripes will be indicated by a change in the frequencies of the sidebands and accordingly the separated signal or one of its sidebands may be used as an indexing signal of high quality.

In some instances, secondary factors within the cathode-ray tube system above described may operate to contaminate the indexing signal so produced so that the signal is no longer precisely definitive of the absolute position of the cathode-ray beam. More particularly, it has been found that, due to manufacturing tolerances of the beam generating elements of the cathode-ray tube, the beam-current versus control-voltage characteriste of the cathode-ray tube may exhibit serious departures from linearity so that undesirable cross-modulation effects may be produced when the video signal and the pilot carrier signal are applied to the intensity control element thereof. The cross-modulation products so produced introduce new components which similarly vary the intensity of the beam and appear as spurious signals in the output indexing circuit of the cathode-ray tube. Since the heterodyne components of the cross-modulation products may have frequencies within the frequency band of the indexing signal, their presence may undesirably affect the system operation and bring about inaccurate or at least degraded reproduction of the colors of the image.

It is an object of the invention to provide an improved cathode-ray tube system of the type in which the position of the electron beam relative to a beam intercepting member is indicated by a signal produced by an indexing member arranged in cooperative relationship to the beam intercepting member.

Another object of the invention is to provide a cathode-ray tube system of the type in which the position of the electron beam is indicated by a signal produced by an associated indexing member and in which a clearly defined indexing signal is generated.

A specific object of the invention is to provide a cathode-ray tube system operating on principles above outlined, and in which spurious signals normally brought about by a cross-modulation action of video and carrier signals applied to the beam intensity control electrode of a cathode-ray tube are avoided.

These and further objects of the invention will appear as the specification progresses.

In accordance with the invention, the foregoing objects are achieved by employing a cathode-ray tube having disposed therein a beam intercepting structure comprising beam position indicating elements arranged in predetermined geometric relationship to other portions of the beam intercepting structure. These beam indicating elements, as above pointed out, may be in the form of spaced stripes and are characterized by values of secondary-emissive ratio or by spectral emission characteristics which differ from those characterizing other regions of the beam intercepting structure when electrons of the cathode-ray beam impinge thereon. When the intensity of the beam is simultaneously varied at a pilot carrier rate and at a rate determined by a color video signal having color information occurring at the repetition rate at which successive color triplets of the beam intercepting structure are scanned, the action of the beam, as it scans the indexing stripes, will in turn produce secondary electrons which generate, in the output circuit of the tube, two component signals. One of the component signals has a frequency proportional to the product of the video signal intensity variations of the beam and the rate of scanning of the indexing stripes, and the other of the component signals has a frequency proportional to the pilot carrier intensity variations of the beam and the rate of scanning of the indexing stripes. Since the latter component signal may be made to have a frequency spectrum widely separated from the frequency spectrum of the first component signal by an appropriate selection of the pilot carrier frequency, the two components may be readily separated in the output collector system of the cathode-ray tube. Furthermore, since the sidebands of the said latter component signal are determined by the algebraic sum of the pilot carrier frequency and the rate of scanning of the index stripes, any departures of the scanning velocity of the beam from linearity or non-uniformities in the position and distribution of the index stripes will be reflected as changes in the frequency of the sidebands, and accordingly the latter component or a sideband thereof may be utilized as an indexing signal.

When the simultaneous variations of the intensity of the beam are effected by applying a video signal and a pilot carrier wave to the control electrode of the cathode-ray tube, it is found that in some instances the non-linearity of the beam-current versus control-voltage characteristic of the tube may produce cross-modulation products of the applied signals and thereby produce undesired signals which additionally vary the intensity of the beam. These additional variations of the intensity of the beam produce spurious signals in the output indexing circuit of the tube because they represent sum and difference frequencies which are the same as the sum and difference frequencies produced by the heterodyne action of the pilot carrier and the index stripes.

In accordance with the invention, the simultaneous variation of the intensity of the cathode-ray beam at the desired pilot carrier frequency and at the impressed video color wave frequency is effected, without simultaneously varying the intensity of the beam at frequencies producing undesired spurious signals in the output indexing circuit of the tube, by applying to the control system of the tube the video signal together with first and second index control signals. The latter signals are so related that their cross-modulation products comprise one component having a frequency at the desired pilot carrier rate, and other components having frequencies so widely different from the pilot carrier rate that the latter components, and their heterodyne products with the indexing stripes, may be readily discriminated against in the index output circuit of the cathode-ray tube. More specifically, and in accordance with the invention, there are applied to the intensity control system of the cathode-ray tube, the color video signal having a color repetition rate approximating the rate of scanning of the color triplets of the image producing screen, a first index control signal having a frequency which is relatively high with respect to the rate of scanning of the index stripes, and a second index control signal having a frequency equal to the algebraic sum of the frequency of the first index control signal and the desired pilot carrier frequency. Because of the non-linear characteristic of the beam intensity control system of the cathode-ray tube, the electron beam is simultaneously varied in intensity not only at the video signal rate but also at rates proportional to the sum and difference frequencies of the above noted three signals applied to the control element. It will be noted that the algebraic sum of the first and second index control signals represents a signal at the desired pilot carrier rate so that the beam is accordingly varied in intensity at this rate. By a suitable selection of the frequency of the first index control signal, all of the remaining products of the cross-modulation action may be made to have frequencies widely different from the desired pilot carrier and its heterodyne components with the indexing stripes, so that these other cross-modulation products and their heterodyne products with the indexing stripes may be readily cancelled or discriminated against in the output indexing circuit of the cathode-ray tube.

The invention will be described in greater detail with reference to the appended drawing forming part of the specification and in which;

Figure 1 is a block diagram, partly schematic, illustrating one embodiment of the invention, Figure 2 is a cross-sectional view, partly cut away, showing a portion of one form of beam intercepting structure for a cathode-ray tube which may be used in the system of the invention.

Referring to Figure 1, the cathode-ray tube system shown therein comprises a cathode-ray tube 10 containing, within an evacuated envelope 12, a conventionally constructed beam generating and accelerating electrode system comprising a cathode 14, a control electrode 16 for varying the intensity of the beam, a focussing electrode 18, and a beam accelerating electrode 20 which may consist of a conductive coating on the inner wall of the envelope and which terminates at a point spaced from the end face 22 of the tube in conformance with well-established practice. Suitable heating means (not shown) are provided for maintaining the cathode 14 at its operating temperature. The electrode system so defined is energized from a suitable source of potential shown as a battery 24 having its negative pole connected to ground and its positive pole connected to the electrode 18 and a battery 26 having its negative pole connected to the positive pole of the battery 24 and its positive pole connected to the accelerating electrode 20. In practice the battery 24 has a potential of the order of 1 to 3 kilovolts whereas the battery 26 has a potential of the order of 10 to 20 kilovolts. The operating potential of the control electrode 16 may be established by a D.-C. restorer connected to the electrode 16 and consisting of a diode 28 appropriately poled and shunting a grid resistor 30. The cathode 14 may be connected to a point of ground potential as shown.

A deflection yoke 32, coupled to horizontal and vertical deflection circuits of conventional design, is provided for deflecting the generated electron beam across the face plate 22 of the cathode-ray tube to form a raster thereon.

The end face plate 22 of the tube is provided with a beam intercepting structure 34, one suitable form of which is shown in detail in Figure 2. In the arrangement shown in Figure 2 the structure 34 is formed directly on the face plate 22. However, the structure 34 may alternatively be formed on a suitable light transparent base which is independent of the face plate 22 and may be spaced therefrom. In the arrangement shown, the end face 22, which in practice consists of glass having preferably substantially uniform transmission characteristics for the various colors in the visible spectrum, is provided with a plurality of groups of elongated parallelly arranged stripes 36, 38 and 40, of phosphor material which, upon impingement by the cathode-ray beam, fluoresce to produce light of three different primary colors. For example, the stripe 36 may consist of a phosphor which produces red light, the stripe 38 may consist of a phosphor which produces green light, and the stripe 40 may consist of a phosphor which produces blue light. Each of the groups of stripes may be termed a color triplet and, as will be noted, the sequence of the stripes is repeated in consecutive order over the area of the structure 34. Suitable materials constituting the phosphor stripes 36, 38 and 40 are well known to those skilled in the art as well as the method of applying the same to the face plate 22, and further details concerning the same are believed to be unnecessary.

In the arrangement specifically shown, the indexing signal is produced by utilizing indexing stripes of a given secondary-emissive ratio differing from the secondary-emissive ratio of the remainder of the beam intercepting structure, and for this purpose the structure 34 further comprises a thin electron permeable conducting layer 42 of low secondary-emissivity. The layer 42 is arranged on the phosphor stripes 36, 38 and 40 and preferably further constitutes a mirror reflecting light generated at the phosphor stripes. In practice the layer 42 is a light reflecting aluminum coating which is formed in well known manner. Other metals capable of forming a coating in the manner similar to aluminum, and having secondary-emissive ratios detectably different from that of the material of the indexing member, may also be used. Such other metals are, for example, magnesium or beryllium.

Arranged on the coating 42, over consecutive green stripes 38, are indexing stripes 44 consisting of a material having a secondary-emissive ratio detectably different from that of the material of coating 42. The stripes 44 may consist of gold or other high atomic number metals such as platinum or tungsten or of an oxide such as magnesium oxide.

The beam intercepting structure so constituted is connected to the positive pole of the battery 26 by means of a suitable lead attached to the aluminum coating 42.

Interposed between the end of the accelerating anode 20 and the beam intercepting structure 22 is an output collector electrode 46 consisting of a ring-shaped coating, for example of graphite or of silver, on the wall of the envelope. Electrode 46 is energized through a load resistor 48 from a suitable source 50, shown as a battery. The source 50 may have a potential of the order of 3 kilovolts.

The cathode-ray beam in its horizontal travel across the beam intercepting structure 43 impinges successively on the coating 42 and the indexing stripes 44. When the beam is varied in intensity at a pilot carrier rate in a manner later to be more fully pointed out, the scanning beam will generate across the load resistor 48 an indexing signal made up of a component at the pilot carrier rate and sidebands representing the sum and difference frequencies of the pilot carrier frequency and the rate at which the index stripes are scanned by the cathode-ray beam.

In a typical case, the pilot carrier variations of the intensity of the beam may occur at a frequency of 38.5 mc./sec. and when the rate of scanning the index stripes 44 is approximately 7 million per second, as determined by the horizontal scanning rate and the number of index stripes 44 impinged per scanning period, a modulated signal at 38.5 mc./sec. and having sidebands at approximately 31.5 and 45.5 mc./sec. is produced. Changes in the rate of scanning of the index stripes 44 due to non-linearities of the beam deflection and/or non-uniformities of the spacing of the index stripes, will produce corresponding changes in the frequencies of the sidebands. Therefore, the signal produced by the intensity variations of the beam at the pilot carrier frequency or a sideband of this signal may be used as an indexing signal indicative of the position of the beam on the surface of the beam intercepting structure 34. In the arrangement specifically shown in Figure 1 the lower sideband, i. e., the sideband at approximately 31.5 mc./sec., is utilized as the indexing signal, and accordingly the signal generated across load resistor 48 is applied through a sideband amplifier and amplitude limiter 52 to a utilization circuit therefor consisting of a mixer 54. Amplifier 52 is of conventional design and is characterized by a band-pass response which transmits and amplifies only signals having frequencies in the range of the above noted lower sideband. The amplifier may embody conventional amplitude limiting means by which any amplitude modulation appearing on the signal may be removed and the amplifier may be adapted to provide the desired amplification without phase distortion of the applied signal.

For the reproduction of a color image on the face plate of the cathode-ray tube, there are provided color signal input terminals 60, 62 and 64 which are supplied from a television receiver with separate signals indicative of the red, green and blue components of the televised scene, respectively. The system then operates to effectively convert these three color signals into a wave having the color information arranged in time reference sequence so that the red information occurs when the cathode-ray beam impinges the red stripe 36 of the beam intercepting structure 34, the green information occurs upon impingement of the green stripe 36 and the blue information occurs when the blue stripe 40 is impinged.

The conversion of the color signals into a color wave with sequentially occurring color components may be brought about by a sampling procedure which effectively connects each of the input terminals in sequence with a common output channel, or may be effected by means of an equivalent modulation system suitably energized by the respective color signals and by appropriately phase related modulation signals. In the arrangement specifically shown, the desired conversion is effected by means of sine wave modulators 66, 68 and 70 in conjunction with an adder 72. Modulators 66, 68 and 70 may be of conventional form and may each consist, for example, of a dual grid thermionic tube to one grid of which is applied the color signal from the respective terminals 60, 62 and 64, and to the other grid of which is applied a modulation signal. The modulation signals are derived from a pilot carrier oscillator 74 through a phase shifter 76, the latter being adapted to produce, by means of suitable phase shifting networks, three modulation voltages appropriately phase displaced. In the arrangement specifically described, wherein the phosphor stripes 36, 38 and 40 (see Figure 2) are uniformly distributed throughout the width of each color triplet, the modulation voltages from the phase shifter, 76 bear a 120° phase relationship as shown.

The individual waves produced at the outputs of the modulators will be sine waves, each amplitude modulated by the color signal applied to the respective modulators and each having a phase relationship determined by the particular modulation signal applied. The three modulators are coupled with their outputs in common whereby the three waves are combined to produce a resultant wave having a frequency equal to that of the oscillator 74 and having amplitude and phase variations proportional to the amplitudes of the color signals. A band-pass filter 78, having a central frequency as determined by the frequency of the modulating signals applied to the modulators, may be arranged in the common output of the modulators to suppress undesirable modulation components.

As will be discussed presently, the pilot carrier oscillator 74 further cooperates with an index control oscillator 90 to vary the intensity of the cathode-ray beam at a pilot carrier rate in accordance with the principles set forth in the above referred to copending application of E. M. Creamer, et al. Accordingly, the oscillator 74 operates at a frequency outside the frequency spectrum of the video color wave applied to the control electrode 16 of the cathode-ray tube, i. e., at a frequency of 38.5 mc./sec. as above specifically illustrated.

The resultant wave at the common output circuit of modulators 66, 68 and 70 is applied to the mixer 54, together with the indexing signal derived from the amplifier and limiter 52, to produce a heterodyne difference signal having amplitude and phase variations as determined by the amplitudes of the color signals at the terminals 60, 62 and 64 and having further phase (and/or frequency) variations as determined by the variations in the rate of scanning the index stripes of the beam intercepting structure of the cathode-ray tube. It will be noted that, since the desired high frequency intensity variation of the cathode-ray beam and the modulation of the color signals at terminals 60, 62 and 64 are at the same frequency, the heterodyne difference signal produced by mixer 54 will have a central frequency equal to the average rate of scanning the index stripes, so that each successive color triplet of the structure 34 will be energized by successive cycles of the said difference signal.

Each of the color signals supplied to the input terminals of modulators 66, 68 and 70 will, in general, include a reference level component definitive of brightness. While each modulator may be constructed so as to transmit this reference level component to its output, in practice this is generally not done. Preferably, the three color signals are combined in proper proportions in an adder 72 to yield a single signal representative of the over-all brightness of the scene to be reproduced and this signal is in turn supplied to an adder 80 where it is combined with the signal produced in the output of mixer 54.

The signal at the output of the adder 80 thus comprises a reference level component establishing the brightness information of the image to be reproduced and a modulated component establishing the chromaticity of the image. This signal is applied through an adder 82 to the control electrode 16 of the cathode-ray tube to thereby intensity modulate the cathode-ray beam in time sequence with the scanning of the electron beam over consecutive phosphor stripes of the beam intercepting structure.

In order to simultaneously vary the intensity of the cathode-ray beam at a rate producing, with the index stripes 44, the desired indexing signal, first and second index control signals are additionally applied to the control grid 16. These index control signals are so correlated that the heterodyne products thereof, brought about by the non-linearity of the control system of the cathode-ray tube, contain a component which varies the intensity of the beam at the desired pilot carrier rate. For this purpose there is provided an index control oscillator 90 which is coupled directly through connection 91 to the adder 82 and thereby supplies the first of the index control voltages to the control grid 16. The second index control voltage is produced by heterodyne action of the wave from oscillator 90 and a wave from the pilot carrier oscillator 74, for example by means of a mixer 92 which is coupled to the oscillator 90, and to the oscillator 74 through an isolation amplifier 94. One sideband of the heterodyne products so produced, i. e. the upper sideband is applied through a band-pass filter 96 to the adder 82 and thence to the control grid 16. Alternatively, the band-pass filter 96 may be arranged to pass both the carrier component and the desired sideband product of the carrier from the oscillator 90 resulting from the modulation action by the mixer 92, thereby making unnecessary the direct link 91 between the oscillator 90 and the adder 82 above described. The described arrangement is preferred however, because it permits more precise control of the signals applied to the adder 82. A suitable frequency for the oscillator 90 is, for example, 100 mc./sec.

Briefly summarizing the above, it will be seen that there are three signals supplied to the control grid 16, as follows:

1. A video color signal having a frequency component corresponding to the rate of scanning the color triplets of the beam intercepting structure, i. e., a frequency component at approximately 7 mc./sec.

2. A first index control signal at a given frequency widely separated from the frequency of the video color signal i. e., at approximately 100 mc./ sec.; this signal being produced by the oscillator 90.

3. A second index control signal at a sum or difference frequency determined by the frequency of the first index control signal and by the desired pilot carrier rate of varying the intensity of the beam i. e., at approximately 138.5 mc./sec.; this signal being produced by the heterodyne action of the outputs of oscillators 74 and 90.

Because of the non-linear control-voltage versus beam-current characteristic of the tube 10, there will be produced sum and difference frequency components of the three applied signals so that the intensity of the beam will be varied simultaneously not only at rates determined by the three signals but also at rates determined by the interaction components.

From a consideration of the frequency values of the three signals applied to the control grid 16 and the frequency values of the interaction components, it will be seen that one interaction component has the desired pilot carrier frequency. Therefore, the intensity of the beam will be varied in one instance at the desired pilot carrier rate, i. e., at 38.5 mc./sec. as determined by the beat frequency between the first index control signal at 100 mc./sec. and the second index control signal at 138.5 mc./sec. The subsequent heterodyne action between the so varied beam and the index stripes, i. e., at 7 mc./sec., will in turn bring about the desired side-band signal, i. e., at approximately 31.5 mc./sec., utilized as an indexing signal.

It will further be noted that none of the three signals applied to the control grid 16, nor their interaction products, nor the heterodyne products produced with the index stripes, with the exception of the desired index signal heterodyne product, have frequency values approximating the frequency of the desired indexing signal. Accordingly, the desired index signal may readily be separated from the remaining signals appearing in the output of tube 10 by a suitable frequency band-pass system, for example by means of the sideband amplifier-limiter 52.

As a general rule, the non-linear characteristic of the tube 10 approximates a square law relationship so that only variations of the intensity of the beam at the applied signal frequencies, at frequencies twice the signal frequencies, and at frequencies equal to the sums and differences of the signal frequencies need be considered. Under this condition the intensity variations of the beam occurring at the pilot frequency are substantially constant notwithstanding beam intensity variations at other frequencies produced, for example, by the video color signal. When the non-linear characteristic of the tube does not approximate a square law relationship, substantially constant variations of the beam intensity at the pilot carrier rate may nevertheless be obtained in accordance with a further feature of the invention, by further applying to the control system of the tube a compensating signal at the pilot frequency. Such a compensating signal when applied to the cathode-ray tube in proper phase and amount, is heterodyned with the video color signal by the cathode-ray tube elements and thereby varies the intensity of the beam in a sense and by an amount cancelling the variations occurring at the pilot carrier rate. The compensating signal may be applied to the control electrode 16, by means of a phase and amplitude control 98 having its input connected to the isolation amplifier 94 and its output connected to adder 82.

While I have described my invention by means of specific examples and in a specific embodiment, I do not wish to be limited thereto for obvious modifications will occur to those skilled in the art without departing from the spirit and scope of the invention.

What I claim is:

1. A cathode-ray tube system comprising a cathode-ray tube having a source of an electron beam, control means to vary the intensity of the beam, a beam intercepting structure for producing a first given response upon impingement by said beam, said structure having portions thereof spaced apart and producing a second given response when said beam impinges thereon, and means to produce an output signal indicative of intensity variations of said beam and of said second given response, said control means being constructed and arranged so as to impart to said cathode ray tube a non-linear beam-current versus control-voltage characteristic producing non-linear interaction of the intensity variations of said beam when a plurality of signals are applied to said control means, means for periodically deflecting said beam across the beam intercepting structure to thereby successively scan said beam over said spaced portions, means for producing a first signal having a frequency spectrum of given maximum extent and being representative of desired variations of said first response, means for producing a second signal having a frequency greater than and widely different from the maximum frequency of said first signal, means for producing a third signal having a frequency greater than the said maximum frequency of said first signal and differing from the frequency of said second signal by a predetermined value, means for applying said first, second and third signals to said control means, and means coupled to said output signal means for deriving therefrom an output wave having a component established by said second and third signals and by the rate of scanning of said beam over said spaced portions.

2. A cathode ray tube system as claimed in claim 1 wherein said control means is constructed and arranged so as to impart to said cathode ray tube a non-linear characteristic approximating a square law relationship, and wherein said output wave deriving means comprises a signal path having a bandpass characteristic adapted to selectively transmit signals having a frequency substantially equal to the algebraic sum of the frequencies of said second and third signals and a third frequency representing the rate of scanning said beam over said spaced portions.

3. A cathode-ray tube system as claimed in claim 1 further comprising means to apply to said control means a fourth signal having a frequency equal to the algebraic sum of the frequencies of said second and third signals.

4. A cathode-ray tube system for producing a color television image, comprising a cathode-ray tube having a source of an electron beam, control means to vary the intensity of the beam, a beam intercepting structure comprising consecutively arranged portions, each comprising a plurality of stripes of fluorescent material, each of said stripes producing light of a different color upon impingement by said beam, said structure having second portions thereof spaced apart and comprising a material having a given response characteristic when said beam impinges thereon, and means to produce an output signal indicative of intensity variations of said beam and of the said given response characteristic, said control means being constructed and arranged to impart to said cathode ray tube a non-linear beam-current versus control-voltage characteristic producing non-linear interaction of the intensity variations of said beam when a plurality of signals are applied to said control means, means for periodically deflecting said beam across the beam intercepting structure to thereby scan said beam over said first and second portions, means for producing a first signal comprising a video color wave having a frequency spectrum of a given maximum extent and including a component having a frequency within said spectrum approximating the rate of scanning said first portions, means for producing a second signal having a frequency greater than and widely different from the maximum frequency of said first signal, means for producing a third signal having a frequency greater than the maximum frequency of said first signal and differing from the frequency of said second signal by a predetermined value, means for applying said first, second and third signals to said control means, and means coupled to said output signal means for deriving therefrom a wave having a component established by said second and third signals and by the rate of scanning of said beam over said spaced portions.

5. A cathode ray tube system for producing a color television image as claimed in claim 4 wherein said control means is constructed and arranged to impart to said cathode ray tube a non-linear characteristic approximating a square law relationship, and wherein said output wave deriving means comprises a signal path having a bandpass characteristic adapted to selectively transmit signals having a frequency substantially equal to the algebraic sum of the frequencies of said second and third signals and a third frequency representing the rate of scanning said beam over the spaced portions.

6. A cathode-ray tube system for producing a color television image as claimed in claim 4, further comprising means to apply to said control means a fourth signal having a frequency equal to the algebraic sum of the frequencies of said second and third signals.

7. A cathode-ray tube system for producing a color television image as claimed in claim 4 wherein said third signal has a frequency value between the maximum frequency value of said first signal and the frequency value of said second signal, wherein said output wave has a frequency substantially equal to the difference between first and second frequency values, said first frequency value being equal to the difference between the frequencies of said second and third signals and said second frequency value approximating the rate of scanning said second portions, and further comprising means to apply to said control means a fourth signal having a frequency value equal to said first frequency value.

8. A cathode-ray tube system for producing a color television image, comprising a cathode-ray tube having a source of an electron beam, control means to vary the intensity of the beam, a beam intercepting structure comprising consecutively arranged portions, each comprising a plurality of stripes of fluorescent material, each of said stripes producing light of a different primary color upon impingement by said beam, said structure having second portions thereof spaced apart and comprising a material having a given response characteristic when said beam impinges thereon, and means to produce an output signal indicative of intensity variations of said beam and of the said given response characteristic, said control means having a non-linear beam-current versus control-voltage characteristic producing non-linear interaction of the intensity variations of said beam when a plurality of signals are applied to said control means, means for periodically deflecting said beam across said beam intercepting structure to thereby successively scan said beam over the said first and second portions, means to generate a pilot carrier wave of a given first frequency, means to produce a first color video wave having a component at the frequency of said pilot carrier wave, means to combine said first color video wave and said output signal to produce a second color video wave having a component at a frequency approximating the rate of scanning of said second portions, means to generate an index control wave of a given second frequency greater than said first frequency, means to combine said pilot carrier wave and said index control wave to produce a heterodyne wave having a frequency equal to the algebraic sum of the said first and second frequencies, means to apply to said control means said second color video wave, said index control wave and said heterodyne wave, and means to derive from said output means said output signal having a frequency equal to the algebraic sum of the frequency of said pilot wave and a frequency representative of the rate of scanning said beam over said spaced portions.

9. A cathode-ray tube system for producing a color television image as claimed in claim 8 further comprising means to apply said pilot carrier wave to said control means.

References Cited in the file of this patent

UNITED STATES PATENTS

| | | |
|---|---|---|
| 2,415,059 | Zworykin | Jan. 28, 1947 |
| 2,490,812 | Huffman | Dec. 13, 1949 |
| 2,530,275 | Weingarten | Nov. 14, 1950 |
| 2,530,431 | Huffman | Nov. 21, 1950 |
| 2,545,325 | Weimer | Mar. 13, 1951 |
| 2,621,244 | Landon | Dec. 9, 1952 |
| 2,635,140 | Dome | Apr. 14, 1953 |